(12) United States Patent
Takeuchi et al.

(10) Patent No.: US 11,329,538 B2
(45) Date of Patent: May 10, 2022

(54) ROTOR OF ROTARY ELECTRIC MACHINE

(71) Applicants: TOSHIBA INFRASTRUCTURE SYSTEMS & SOLUTIONS CORPORATION, Kawasaki (JP); Toshiba Industrial Products and Systems Corporation, Kawasaki (JP)

(72) Inventors: Katsutoku Takeuchi, Kokubunji (JP); Makoto Matsushita, Fuchu (JP); Yuji Yamamoto, Mie (JP); Masaaki Matsumoto, Mie (JP)

(73) Assignees: TOSHIBA INFRASTRUCTURE SYSTEMS & SOLUTIONS CORPORATION, Kawasaki (JP); Toshiba Industrial Products and Systems Corporation, Kawasaki (JP)

(*) Notice: Subject to any disclaimer, the term of this patent is extended or adjusted under 35 U.S.C. 154(b) by 4 days.

(21) Appl. No.: 16/855,013

(22) Filed: Apr. 22, 2020

(65) Prior Publication Data

US 2020/0343798 A1 Oct. 29, 2020

(30) Foreign Application Priority Data

Apr. 23, 2019 (JP) .............................. JP2019-082034

(51) Int. Cl.
*H02K 19/14* (2006.01)
*H02K 1/24* (2006.01)

(52) U.S. Cl.
CPC .............. *H02K 19/14* (2013.01); *H02K 1/246* (2013.01)

(58) Field of Classification Search
CPC .......... H02K 1/24; H02K 19/14; H02K 1/246; H02K 2213/03
See application file for complete search history.

(56) References Cited

U.S. PATENT DOCUMENTS

| | | | |
|---|---|---|---|
| 10,367,385 B2 * | 7/2019 | Mikami | .................. H02K 1/278 |
| 2017/0222505 A1 * | 8/2017 | Janjic | .................... H02K 1/246 |
| 2017/0366075 A1 * | 12/2017 | Tong | .................... H02K 19/103 |
| 2019/0207441 A1 | 7/2019 | Takeuchi et al. | |
| 2019/0229568 A1 | 7/2019 | Toda et al. | |
| 2019/0238035 A1 | 8/2019 | Matsumoto et al. | |

FOREIGN PATENT DOCUMENTS

| | | | |
|---|---|---|---|
| JP | 2001-186735 A | 7/2001 | |
| JP | 2002-199675 A | 7/2002 | |
| JP | 2003-009484 A | 1/2003 | |

(Continued)

*Primary Examiner* — Naishadh N Desai
(74) *Attorney, Agent, or Firm* — Oblon, McClelland, Maier & Neustadt, L.L.P.

(57) ABSTRACT

According to one embodiment, in a lateral cross section, a rotor core includes a plurality of layers of barrier regions formed to be arranged in a radial direction with intervals in each magnetic pole. Each barrier region includes a flux barrier extending from near a part of an outer circumferential surface through d axis to near another part thereof. At least a flux barrier of a barrier region provided at an outermost circumferential surface side is filled with a non-magnetic conductive material. A barrier-side edge on a side of the central axis, which defines the flux barrier of the barrier region provided in an outermost circumferential surface side is located within a range of $0.55 < 2a/R^2 < 0.84$.

3 Claims, 6 Drawing Sheets

(56) References Cited

FOREIGN PATENT DOCUMENTS

| | | |
|---|---|---|
| JP | 4098939 B2 | 6/2008 |
| JP | 4588255 B2 | 11/2010 |
| JP | 2017-50918 A | 3/2017 |
| JP | 2018-61404 A | 4/2018 |
| JP | 2018-68090 A | 4/2018 |
| WO | WO 2018/051690 A1 | 3/2018 |

* cited by examiner

ROTOR OF ROTARY ELECTRIC MACHINE

CROSS-REFERENCE TO RELATED APPLICATIONS

This application is based upon and claims the benefit of priority from Japanese Patent Application No. 2019-082034, filed Apr. 23, 2019, the entire contents of which are incorporated herein by reference.

FIELD

Embodiments described herein relate generally to a rotor of a rotary electric machine.

BACKGROUND

A synchronous reluctance motor is proposed as a rotary electric machine. A rotor of the reluctance motor is provided with a flux barrier formed of a nonmagnetic material. In such a reluctance motor, torque is produced by creating salient polarity due to the difference in magnetic permeability between the rotor core and the flux barrier. A typical example of the nonmagnetic material (whose relative permeability is about 1) is air. For this reason, in many examples of the inverter-driven synchronous reluctance motor, the flux barrier is formed as a cavity (in which no member is provided).

Meanwhile, aluminum, copper and the like are nonmagnetic materials, but they are conductive materials as well. For this reason, by filling a flux barrier with aluminum, copper or the like, a secondary conductor can be formed. More specifically, induction torque is produced in an asynchronous state (in which the rotational speed of the rotating field of the stator and the physical rotational speed of the rotor do not agree with each other, thereby causing sliding), and thus it is possible to realize a self-starting synchronous reluctance motor, which can be line-driven.

The self-starting synchronous reluctance motor does not require an inverter for drive, and therefore it can improve the efficiency as the entire motor drive system and can also reduce the system cost.

However, the conventional technology still entails such drawbacks that sufficient induction torque cannot be ensured and therefore a starting performance which satisfies the required specification cannot be obtained. For example, in a reluctance motor having a large moment of inertia, it may not be unable to accelerate it to the synchronous speed (it cannot be synchronized) if the loads of outputs are the same.

In order to enlarge induction torque, it is necessary to enlarge the cross section of the secondary conductor and to decrease the secondary resistance. However, when the area of the secondary conductor is enlarged, the magnetic balance of the rotor is disturbed and the salient polarity of the rotor is decreased. That is, even if synchronization is achieved, the torque and the power-factor are low while being driven synchronously, thus making it difficult to sufficiently exhibit the performance as the synchronous reluctance motor.

BRIEF DESCRIPTION OF THE DRAWINGS

FIG. 4 is a diagram illustrating a circle having a radius R and circumscribing an outer circumference of a rotor core and a hyperbola g of a proportionality factor a.

DETAILED DESCRIPTION

Various embodiments will be described hereinafter with reference to the accompanying drawings. In general, according to one embodiment, a rotor of a rotary electric machine, comprises: a shaft rotatable around a central axis; and a rotor core comprising a plurality of magnetic poles arranged in a circumferential direction around the central axis, and coaxially fixed to the shaft. When, in a lateral cross section of the rotor core, normal to the central axis, an axis extending through a boundary between adjacent magnetic poles and the central axis is defined as a d axis and an axis magnetically intersecting perpendicular to the d axis is defined as a q axis, the rotor core comprises a plurality of layers of barrier regions formed to be arranged in a radial direction with intervals respectively therebetween, in the plurality of magnetic poles, and the plurality of barrier regions each comprises a flux barrier extending from near a part of an outer circumferential surface of the rotor core through the d axis to near another part of the outer circumferential surface, a first bridge portion formed of an iron core located between one end of the flux barrier and the outer circumferential surface and a second bridge portion formed of an iron core located between an other end of the flux barrier and the outer circumferential surface, and at least a flux barrier of a barrier region provided at an outermost circumferential surface side being filled with a nonmagnetic conductive material. When a radius of a circle circumscribed on the outer circumferential surface is represented by R and an equation of a hyperbola X coordinates and Y coordinates of which are two q axes adjacent to each other in the circumferential direction is defined as xy−a=0, a barrier-side edge on a side of the central axis, which defines the flux barrier of the barrier region provided in an outermost circumferential surface side is located within a range of $0.55 < 2a/R^2 < 0.84$.

Note that the disclosure below is given as merely exemplary. A person skilled in the art could easily conceive to appropriately modify within the spirit of the invention, and it is a matter of course that all of modifications belong to the scope of the invention. In addition, the drawings may schematically illustrate widths, thicknesses, and shapes of the respective parts compared to the actual appearance in order to make the explanation more clear, but these are given as merely exemplary. The interpretation of the invention should not be limited to the drawings. In the specification and the drawings of this application, the same symbol will be attached to the same element described already in the previous drawings, and the detailed description will be appropriately omitted.

EMBODIMENT

Figure 1:
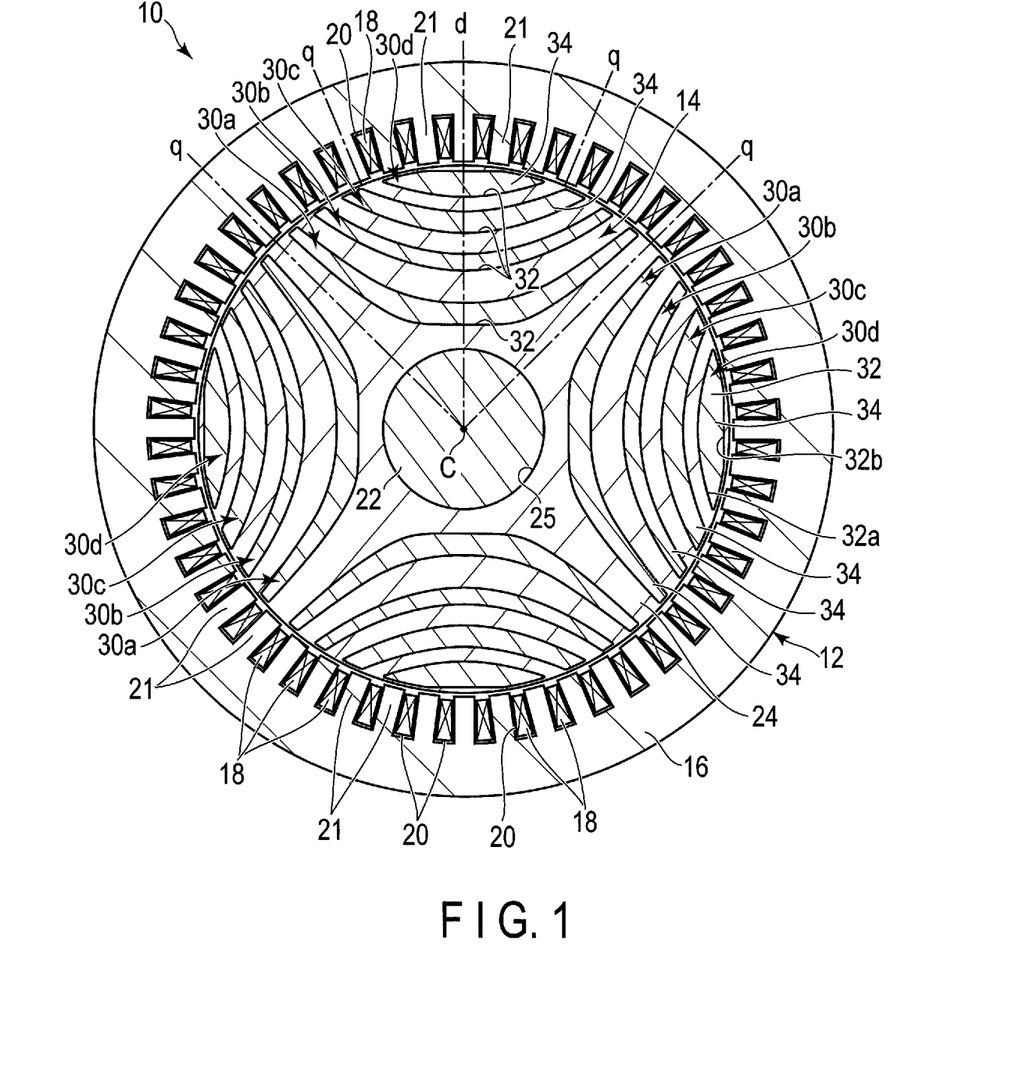
FIG. 1 is a lateral cross sectional view of a rotary electric machine according to an embodiment.
Figure 2:
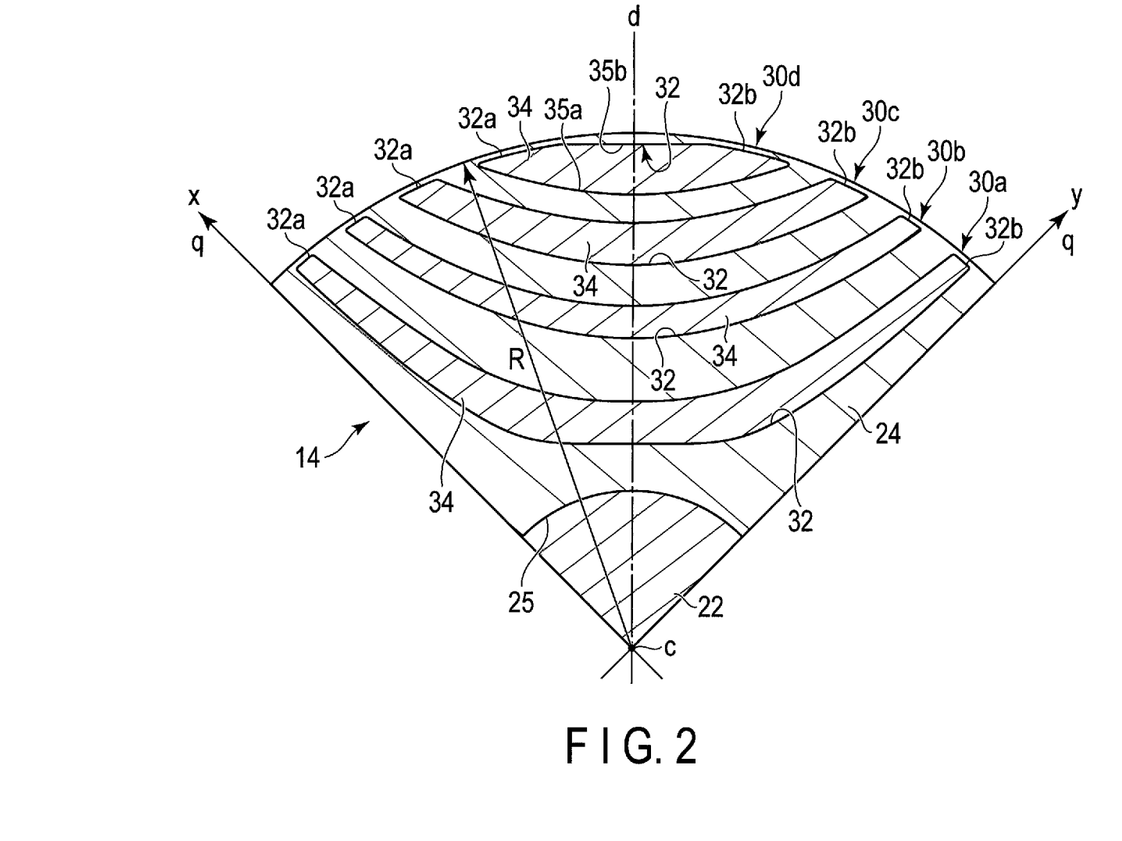
FIG. 2 is an expanded lateral cross sectional view of one magnetic pole portion of the rotor of the rotary electric machine.

FIG. 1 is a lateral cross sectional view of a rotary electric machine according to an embodiment, and FIG. 2 is an expanded lateral cross sectional view of one magnetic pole portion of the rotor of the rotary electric machine.

As shown in FIG. 1, a rotary electric machine 10 is configured, for example, as an inner rotor type rotary electric machine, and an annular or cylindrical stator 12 supported by a fixation frame (not shown) and a rotor 14 supported inside the stator so as to be rotatable around a central axis C and coaxial with the stator 12. In the embodiment, the rotary electric machine 10 constitutes a self-starting reluctance motor.

The stator 12 comprises a cylindrical stator core 16 and an armature coil 18 wound around the stator core 16. The stator core 16 is formed by laminating a number of annular electromagnetic plates of a magnetic material, for example, silicon steel in a coaxial manner. The stator core 16 can as well be formed by pressing soft magnetic powder. In an inner circumferential portion of the stator core 16, a plurality of slots 20 are formed. The slots 20 are arranged along a circumferential direction at regular intervals. Each slot 20 is opened in an inner circumferential surface of the stator core 16, and extends out in a radial direction from the inner circumferential surface. Moreover, the slots 20 each extend over full length along the axial direction of the stator core 16. With the plurality of slots 20 thus formed, an inner circumferential portion of the stator core 16 constitutes a plurality of (for example, forty eight in this embodiment) stator teeth 21 facing the rotor 14. The armature coil 18 is embedded in the slots 20, and would around respective stator teeth 21 each via an insulator or an insulating coat (not shown). As current is allowed to pass through the armature coil 18, a predetermined flux linkage is produced in the stator 12 (stator teeth 21).

The rotor 14 includes a cylindrically shaped shaft (rotation shaft) 22 and a cylindrically shaped rotor core 24 fixed at substantially an axial center of the shaft 22 so as to be coaxial therewith. The shaft 22 is rotatably supported around the central axis C with a bearing (not shown). The rotor 14 is placed inside the stator 12 so as to be coaxial therewith with a slight gap (air gap) therebetween. An outer circumferential surface of the rotor core 24 opposes an inner circumferential surface of the stator 12 with a slight gap therebetween. The rotor core 24 comprises an inner hole 25 formed to be coaxial with the central axis C. The shaft 22 is inserted to and fit with the inner hole 25 so as to extend coaxially with the rotor core 24. The rotor core 24 is formed from a lamination body in which a number of annular electromagnetic plates of a magnetic material, for example, silicon steel are laminated in a coaxial manner. The rotor core 24 can be formed by pressing a soft magnetic powder.

In this embodiment, the rotor 14 is set to be multi-pole, for example, quadrupole. In the rotor core 24, a direction normal to the central axis C is referred to as a radial direction, and a direction around the central axis C is referred to as a circumferential direction. Further, axes each passing the central axis C and also a respective boundary between respective adjacent magnetic poles and extending in a radial direction or a diametrical direction to the central axis C are referred to as a d axis, and axes electrically and magnetically intersecting normal to the d axis are each referred to as a q axis. Here, directions in which a flux linkage produced by the stator 12 easily flows are set as the q axes. The d axes and q axes are provided alternately along the circumferential direction of the rotor core 24 and in predetermined phases. One magnetic pole portion of the rotor core 24 is referred to a region between an adjacent pair of two q axes (quadrant circular angle region). Thus, the rotor core 24 is configured as quadrupole (magnetic poles). A circumferential center of one magnetic pole serves as the d axis.

FIG. 2 is a cross sectional view showing one magnetic pole portion of the rotor, which is a quadrant circular region thereof. As shown in FIGS. 1 and 2, the rotor core 24 comprises a plurality of, for example, four layers of barrier regions 30a, 30b, 30c and 30d for each magnetic pole. In each magnetic pole, the four layers of the barrier regions 30a to 30d are arranged in the order from a central axis C side to an outer circumferential surface side in the radial direction (d axis direction) of the rotor core 24 with intervals therebetween. That is, the barrier regions 30a to 30d each reach from one location in the outer circumferential surface of the rotor core 24 through the d axis to some other location of the outer circumferential surface, and extend while curving in a convex manner with respect to the central axis C. The plurality of barrier regions 30a to 30d are formed respectively between a plurality of magnetic paths through which the magnetic flux formed by the stator 12 passes, so as to separate the magnetic paths from each other.

In this embodiment, the barrier regions 30a to 30d each comprise a flux barrier (gap layer) 32 extending in a hyperbolic fashion around the d axis as a center, a thin coupling portion (first bridge portion) 32a formed from an iron core located between one end and an outer circumferential surface of the flux barrier 32 and a thin coupling portion (second bridge portion) 32b formed from an iron core located between the other end and the outer circumferential surface of the flux barrier 32.

For example, in the barrier region 30a provided in an innermost circumferential side, one end of the flux barrier 32 is located near the outer circumferential surface and also near one q axis and the other end of the flux barrier 32 is located near the outer circumferential surface and also near the other q axis. The flux barrier 32 extends from the one end to the other end along the q axes so that circumferential center thereof is located at the radially innermost side while curving in a convex manner from the outer circumferential side to the central axis C on a radially inner side.

The barrier regions 30b, 30c and 30d of the second layer, the third layer and the outermost layer are arranged along the d axial direction with an interval between themselves and the barrier region 30a of the innermost layer. Note that the barrier regions may not necessarily be formed in four layers, but may be in two, three layers, or in five or more layers. Further, each flux barrier is not limited to one continuous layer but may be a plurality of divided barrier layers.

At least in the flux barrier 32 of the barrier region 30d of the outermost layer is filled with a nonmagnetic conductive material such as aluminum or copper, thus forming a secondary conductor 34. In this embodiment, the flux barriers 32 of the barrier regions 30a to 30d of four layers are filled with a nonmagnetic conductive material, thus forming the secondary conductors 34, respectively. These secondary conductors 34 are short-circuited to each other with a short-circuiting member (not shown) provided an axial end of the rotor core 24, thus constituting a secondary coil.

Figure 3:
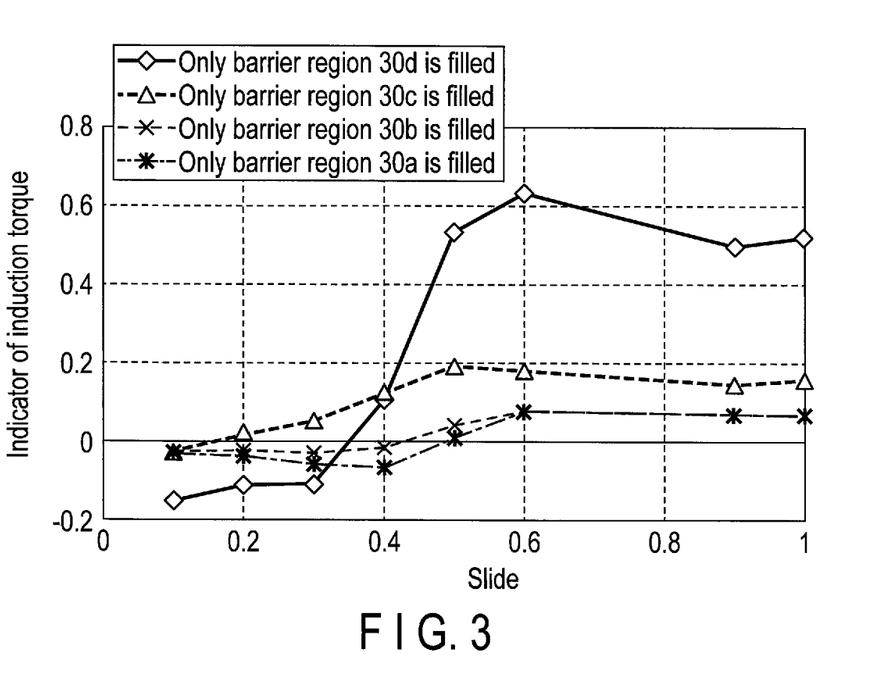
FIG. 3 is a diagram showing states of induction torque produced to be compared with each other when flux barriers of respective barrier regions of the rotor are filled with a nonmagnetic conductive material.

As described above, a plurality of layers of barrier regions are provided in substantially a hyperbolic manner. FIG. 3 shows comparison among the secondary conductor regions in what degree of induction torque is created thereby when the flux barrier 32 of each barrier region is filled with a nonmagnetic conductive material. As shown, the most of the induction torque is created in the secondary conductor 34 in which the flux barrier 32 of the barrier region 30d on the outermost circumferential side, which is closest to the outer circumferential surface of the rotor 14 is filled. This is because there is more interlinking q axis magnetic flux in the secondary conductor 34 located closer to the outer circumferential surface. That is, in order to increase the induction torque, it is effective to enlarge the area of the flux barrier 32 and fill the area with a nonmagnetic conductive material. Now, to what extent the flux barrier 32 of the barrier region 30d can be expanded will now be verified.

Figure 4:
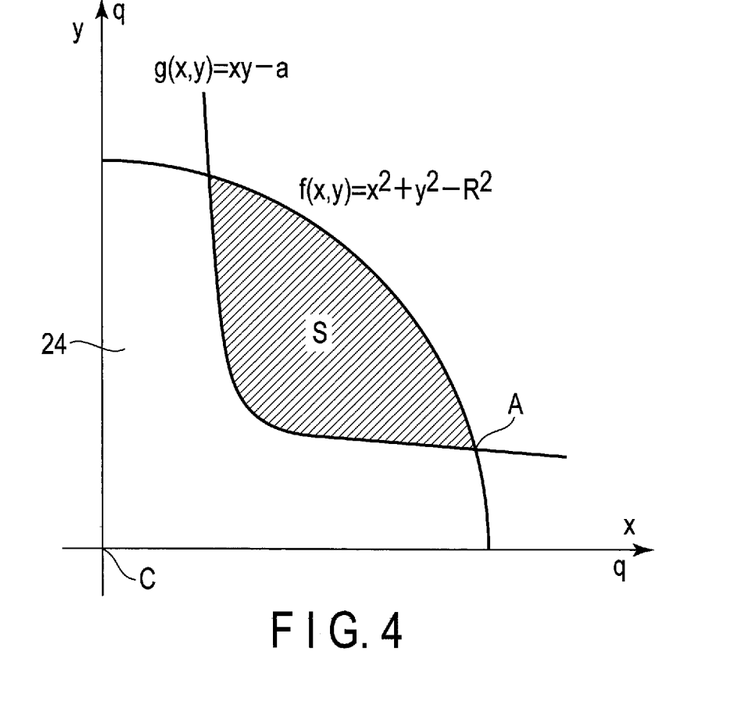

FIG. 4 illustrates a circle having a radius R, circumscribed on the outer circumference of the rotor core, which can be expressed as: f(x, y)=0, and a hyperbola to a proportionality factor a, which can be expressed as: g(x, y)=0. In FIG. 4, it is assumed that X coordinates and Y coordinates normal to each other correspond to q axes, respectively. In FIG. 4, the circumscribed circle f and the hyperbola g can be expressed as follows.

$$\begin{cases} f(x, y) = x^2 + y^2 - R^2 = 0 \\ g(x, y) = xy - a = 0 \end{cases} \quad \text{[Formulas 1]}$$

The area S of the region surrounded by these curves can be calculated by the following formula.

$$S = \frac{R^2}{2}\left\{\frac{\pi}{2} - \sin^{-1}t + t\ln\left(\frac{1-\sqrt{1-t^2}}{t}\right)\right\} \quad \text{[Formula 2]}$$

In the above formula, $t=2a/R^2$ and t is a barrier constant. From the condition that there is an area surrounded by f(x, y)=0 and g(x, y)=0, (there are two intersections), a relationship 0≤t<1 is established.

Let us suppose the case where the circumscribed circle: f(x, y)=0 expresses the outer circumference of the rotor core, the region surrounded by the circumscribed circle and the hyperbola g(x, y)=0 is the secondary conductor area, and the region defined by g(x, y)<0 is an iron core portion. Here, it is considered that the magnetic potential applied from the armature coil is distributed in substantially a sine wave shape, and the density of the flux generated in the gap between the inner circumference of the stator and the outer circumference of the rotor is also distributed in substantially a sine wave shape. Therefore, the flux density $B_q$ of the gap in the case where the q axis magnetic flux is generated can be expressed as follows.

$$B_q \propto B \cos 2\theta \quad \text{[Formula 3]}$$

where θ is a circumferential component when expressed in polar coordinate. When, of the intersections of the functions f(x, y)=0 and g(x, y)=0, the one close to the x axis is assigned as A, it can be expressed as: (r, θ)=(R, (sin⁻¹t)/2) in polar coordinate. Therefore, the q axis magnetic flux $\Phi_q$ is proportional to the result of integrating $B_q$ toward the intersection A from the x-axis.

$$\Phi_q \propto \int_0^{\frac{\sin^{-1}t}{2}} B_q \, d\theta = \frac{Bt}{2} \quad \text{[Formula 4]}$$

If the q axis magnetic flux $\Phi_q$ changes at an angular velocity ω, an induction voltage V is generated in the secondary conductor area by the Faraday's law.

$$V = \omega \Phi_q \quad \text{[Formula 5]}$$

Here, the resistance of the secondary conductor area is inversely proportional to the area S of the secondary conductor area, and therefore a current I flowing in the secondary conductor area can be expressed as follows.

$$I \propto VS \propto t\left\{\frac{\pi}{2} - \sin^{-1}t + t\ln\left(\frac{1-\sqrt{1-t^2}}{t}\right)\right\} \quad \text{[Formula 6]}$$

An induction torque $T_m$ generated at this time is proportional to the current I and the magnetic flux $\Phi_q$, the formula can be rewritten as follows.

$$T_m \propto t^2\left\{\frac{\pi}{2} - \sin^{-1}t + t\ln\left(\frac{1-\sqrt{1-t^2}}{t}\right)\right\} \quad \text{[Formula 7]}$$

Next, a reluctance torque $T_r$ is focused. The reluctance torque $T_r$ is produced due to the difference between the magnetic flux of the d axis and the magnetic flux of the q axis. When the d-axis magnetic flux $\Phi_d$ is calculated in a similar manner to that of the q-axis magnetic flux $\Phi_q$, the following relationship can be obtained.

$$\Phi_d \propto \int_0^{\frac{\sin^{-1}t}{2}} B_d \, d\theta = \int_0^{\frac{\sin^{-1}t}{2}} B \sin 2\theta \, d\theta = \frac{B}{2}\{1 - \cos(\sin^{-1}t)\} \quad \text{[Formula 8]}$$

Therefore, the reluctance torque $T_r$ can be expressed as follows.

$$T_r \propto \Phi_q - \Phi_d \propto t - 1 + \cos(\sin^{-1}t) \quad \text{[Formula 9]}$$

Figure 5:
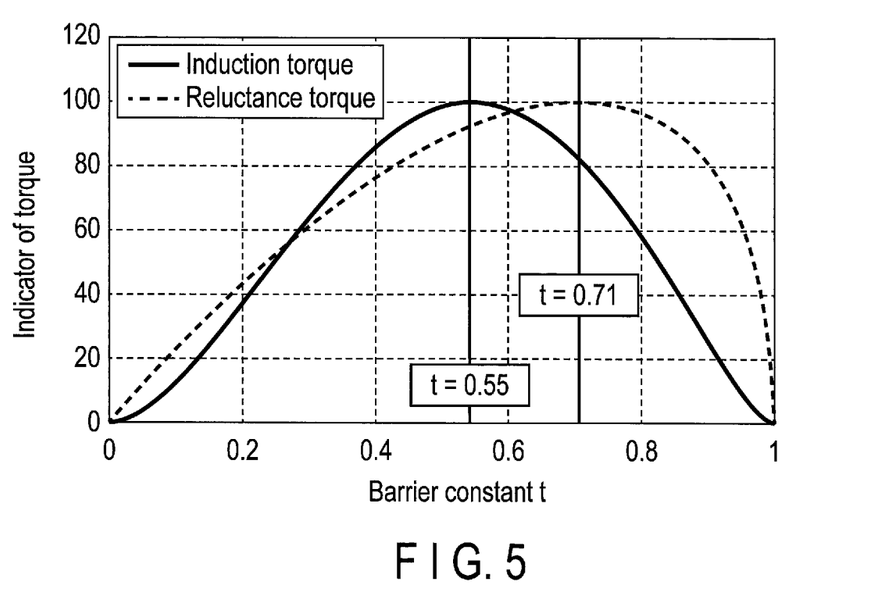
FIG. 5 is a diagram showing a relationship between induction torque and reluctance torque in the case where a barrier region is provided in only one layer, which is the outermost layer.

FIG. 5 illustrates $T_m$ and $T_r$, in which the maximum values of $T_m$ and $T_r$ are respectively standardized. As shown in FIG. 5, the induction torque $T_m$ becomes a maximum when t=0.55, and the reluctance torque $T_r$ becomes a maximum when t=0.71. Therefore, theoretically, when the barrier region 30d is disposed to satisfy t=0.71, the induction torque $T_m$ can be maximized without lowering the reluctance torque $T_r$. Moreover, when it is set as t=0.55, the induction torque $T_m$ can be maximized while suppressing the lowering of the reluctance torque $T_r$ to a minimum level. Thus, it depends on whether such a design that the priority is given to the reluctance torque (steady characteristic-oriented) or such a design that the induction torque is maximized (starting characteristic-oriented) should be taken, it is desirable to use t properly in a range of 0.55<t<0.71.

Note that when considered as an arc ratio θ, (as in the case of JP 4588255 B, the barrier constant t can be converted as follows.

$$\theta = \frac{\pi}{2} - \sin^{-1} t \quad \text{[Formula 10]}$$

Therefore, t=0.55 corresponds to θ=57 degrees, t=0.71 corresponds to θ=45 degrees, and t=0.84 corresponds to θ=33 degrees.

The discussion made so far is based on a theoretical study for the case where the barrier region is provided in one layer of the outermost circumferential layer, as shown in FIG. 4. However, usually, a plurality of layers of barrier regions are provided to further increase the reluctance torque. More specifically, as in this embodiment, the barrier regions 30c, 30b, 30a and the like are provided at locations closer to the central axis C as compared to the barrier region 30d. In this case, the reluctance torque is generated not only by the barrier region 30d but also by the barrier regions 30c, 30b and 30a. Thus, it is expected that the value of the barrier constant t which maximizes the reluctance torque may change from 0.71.

Figure 7:
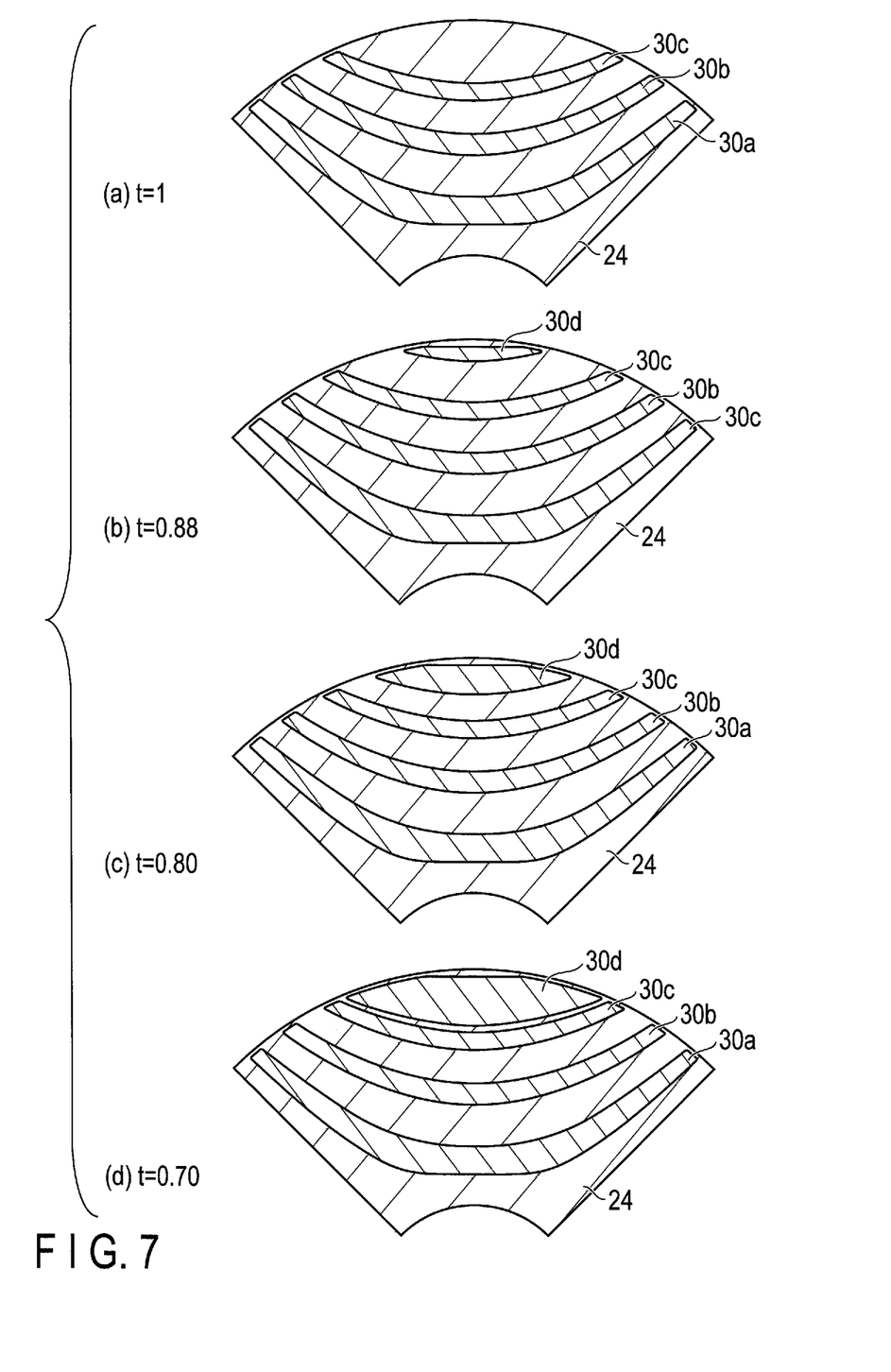
FIG. 7 includes cross sectional views of one magnetic pole portion of a rotor core in the cases where the barrier region in the outermost layer is changed variously from one location to another in the rotor in which the barrier region is provided in a plurality of layers.

Under these circumstances, the torque for the case where only the barrier region 30d of the outermost layer is changed in the structure including the the barrier regions 30d, 30c, 30b and 30a was calculated by the magnetic field analysis. FIG. 7, which includes parts (a) to (d), shows cross sections of one magnetic pole portion of the rotor core when the barrier region 30 was changed in variously manners. As shown, the region occupied by the barrier region 30a becomes greater as the barrier constant t becomes less. For example, FIG. 7, part (a) shows the cross section when t=0, and FIG. 7, part (d) shows the cross section when t=0.7.

Figure 6:
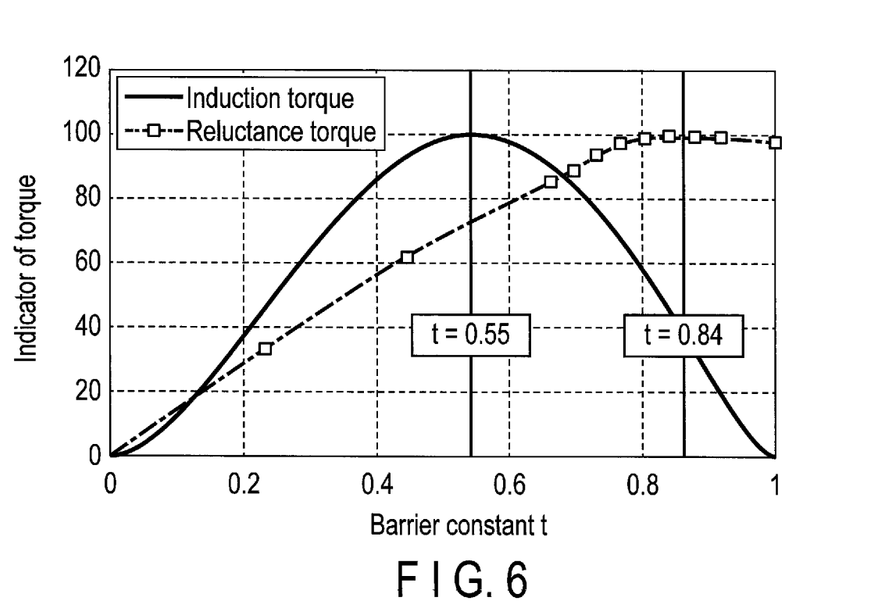
FIG. 6 is a diagram showing a relationship between the induction torque and reluctance torque in a rotor in which a barrier region is provided in a plurality of layers.

FIG. 6 shows the results of the analysis of the torque. Note in FIG. 6, the phase angle of the current was changed for a fixed barrier constant t, and the calculation was performed to acquire values obtained in a phase in which the torque becomes the maximum, which are plotted in the graph. Thus, when a plurality of layers of barrier regions (flux barriers) are provided, the reluctance torque $T_r$ is generated by the barrier regions 30c, 30b and 30a under the condition of t=1, by which the barrier region 30d vanishes. Therefore, the reluctance torque becomes the maximum when t=0.84, which is greater than the value t=0.71 obtained when there is only one layer of barrier region provided, by a theoretical calculation. As a result, the set value of the optimal barrier constant t is defined as 0.55<t<0.84. When the efficiency of the reluctance torque is considered to be critical, it is desirable to place the set value of the barrier constant t ($2a/R^2$) to satisfy: 0.55<t<0.78.

Figure 8:
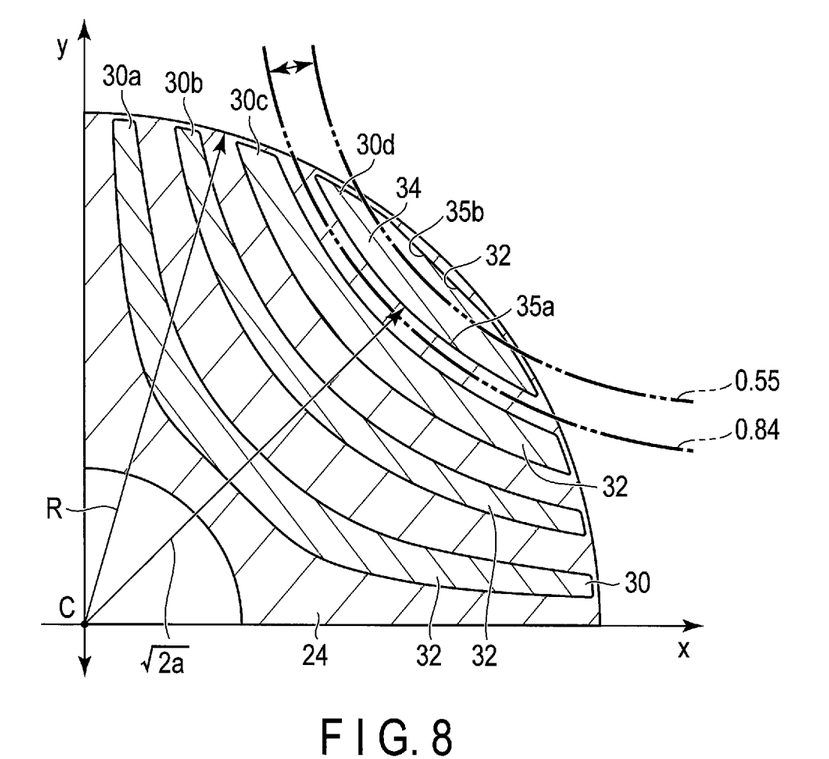
FIG. 8 is an enlarged lateral cross section view of one magnetic pole portion of the rotor.

As shown in FIG. 8, the flux barrier 32 of the barrier region 30d of the outermost layer is defined between the inner circumferential-side edge (barrier-side edge) 35a and the outer circumferential-side edge 35b opposing thereto with a gap therebetween. Then, the flux barrier 32 is formed so that the inner circumferential-side edge (barrier-side edge) 35a is located in the region between the hyperbola when t=0.84 and the hyperbola when t=0.55. Thus, such a rotor of a rotary electric machine which can increase the induction torque $T_m$ without decreasing the reluctance torque $T_r$ can be obtained.

Note that when the number of layers of barrier regions is changed, pulsation components including a torque ripple greatly change, but the average torque which contributes to the actual output does not significantly change. In other words, in this embodiment, there are four layers of barrier regions are provided, but it is considered that a similar tendency to that described above can be obtained if three or less layers or five or more layers are provided.

Moreover, the shape of the inner circumferential-side edge (barrier-side edge) 35a of the flux barrier 32 may not necessarily be a perfect hyperbola. More specifically, it suffices if the inner circumferential-side edge 35a of the flux barrier 32 extends within a region of a range of 0.55 to 0.84 described above, and it may be a polygonal shape such as bath tub-like or a shape approximated to a circle.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The above-provided embodiment is directed to a quadru-pole rotor, but it is not limited to this. For example, the rotor may be of a dipole type or of a six magnetic pole type. The number of poles of the rotor, the size, shape, the number of layers of barrier regions, and the like are not limited to those of the embodiment described above, but may be variously changed according to the design.

What is claimed is:

1. A rotor of a rotary electric machine, comprising:
a shaft rotatable around a central axis; and
a rotor core comprising a plurality of magnetic poles arranged in a circumferential direction around the central axis, and coaxially fixed to the shaft,
when, in a lateral cross section of the rotor core, normal to the central axis, an axis extending through a boundary between adjacent magnetic poles and the central axis is defined as a d axis and an axis magnetically intersecting perpendicular to the d axis is defined as a q axis,
the rotor core comprising a plurality of layers of barrier regions formed to be arranged in a radial direction with intervals respectively therebetween, in the plurality of magnetic poles, and
the plurality of barrier regions each comprising a flux barrier extending from near a part of an outer circumferential surface of the rotor core through the d axis to near another part of the outer circumferential surface, a first bridge portion formed of an iron core located between one end of the flux barrier and the outer circumferential surface and a second bridge portion formed of an iron core located between an other end of the flux barrier and the outer circumferential surface, and at least a flux barrier of a barrier region provided at an outermost circumferential surface side being filled with a nonmagnetic conductive material, and
when a radius of a circle circumscribed on the outer circumferential surface is represented by R and an equation of a hyperbola X coordinates and Y coordinates of which are two q axes adjacent to each other in the circumferential direction is defined as xy−a=0,
a barrier-side edge on a side of the central axis, which defines the flux barrier of the barrier region provided in an outermost circumferential surface side being located within a range of $0.55 < 2a/R^2 < 0.84$.

2. The rotor of claim 1, wherein
the barrier-side edge on the side of the central axis is located within a range of $0.55<2a/R^2<0.78$.

3. The rotor of claim 1, wherein
each of the plurality of barrier regions is curved in a convex manner toward the central axis.

\* \* \* \* \*